United States Patent
Casati et al.

(10) Patent No.: US 10,601,527 B2
(45) Date of Patent: Mar. 24, 2020

(54) FAILURE DETECTION SYSTEM OF TRANSMITTING ANTENNAS

(71) Applicant: DAC SYSTEM SA, Manno (CH)

(72) Inventors: Pietro Casati, Ruvigliana (CH); Angelo Brustia, Trecate (IT)

(73) Assignee: DAC System SA, Manno (CH)

( * ) Notice: Subject to any disclaimer, the term of this patent is extended or adjusted under 35 U.S.C. 154(b) by 425 days.

(21) Appl. No.: 15/514,293

(22) PCT Filed: Sep. 24, 2014

(86) PCT No.: PCT/IB2014/064808
§ 371 (c)(1),
(2) Date: Mar. 24, 2017

(87) PCT Pub. No.: WO2016/046600
PCT Pub. Date: Mar. 31, 2016

(65) Prior Publication Data
US 2017/0294974 A1    Oct. 12, 2017

(51) Int. Cl.
*H04B 17/00* (2015.01)
*H04B 17/17* (2015.01)
*H04B 17/10* (2015.01)

(52) U.S. Cl.
CPC ........... *H04B 17/17* (2015.01); *H04B 17/103* (2015.01)

(58) Field of Classification Search
CPC combination set(s) only.
See application file for complete search history.

(56) References Cited

U.S. PATENT DOCUMENTS

| | | | |
|---|---|---|---|
| 8,896,497 B1* | 11/2014 | Kullman | H01Q 1/1264 |
| | | | 343/882 |
| 2005/0124304 A1 | 6/2005 | Bendov | |
| 2006/0083186 A1 | 4/2006 | Handforth et al. | |
| 2010/0133629 A1* | 6/2010 | Zhang | H01L 23/3157 |
| | | | 257/414 |
| 2010/0222012 A1* | 9/2010 | Shibuya | H04B 1/525 |
| | | | 455/79 |
| 2011/0141895 A1* | 6/2011 | Zhang | H04L 12/66 |
| | | | 370/235 |
| 2012/0249165 A1* | 10/2012 | Mcerlean | A61B 18/1815 |
| | | | 324/642 |

FOREIGN PATENT DOCUMENTS

| | | |
|---|---|---|
| GB | 2346292 A | 8/2000 |
| JP | 2004096236 A | 3/2004 |

OTHER PUBLICATIONS

International Search Report and Written Opinion of PCT/IB2014/064808, dated May 26, 2015, 10 pages.

* cited by examiner

*Primary Examiner* — Nhan T Le
(74) *Attorney, Agent, or Firm* — Blank Rome LLP

(57) ABSTRACT

A failures detection system (1) of a plurality of transmitting antennas of television and/or radio signals. The system includes a power divider splitting a television and/or radio signal (STV) to a plurality and antennas, and a plurality of directional couplers and of signal concentrators that send a multiplexed signal containing information on the SWR, power, and environmental parameters to a processing module (22) configured to process the multiplexed signal generating diagnostics and warning signals.

19 Claims, 5 Drawing Sheets

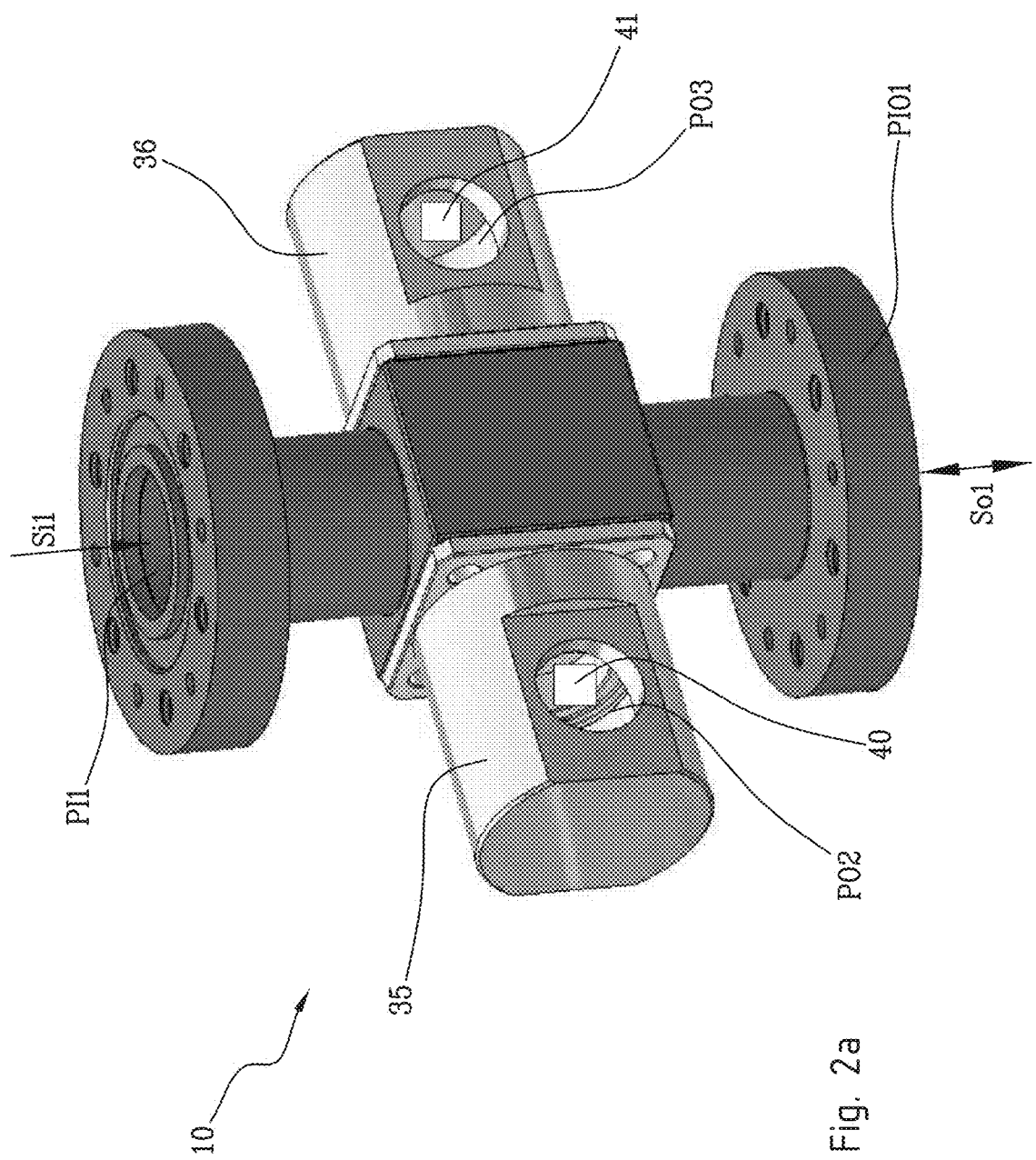

FAILURE DETECTION SYSTEM OF TRANSMITTING ANTENNAS

RELATED APPLICATIONS

This application is a national phase of PCT/IB2014/064808, filed on Sep. 24, 2014. The content of this application is hereby incorporated by reference.

TECHNICAL FIELD OF THE INVENTION

The present invention relates in general to the field of antennas. More particularly, the present invention relates to a failure detection system of antennas transmitting television and radio signals.

TECHNICAL NOTE

The towers used for the distribution of television and radio signals are composed of a plurality of antennas that have the function of transmitting the television and radio signals in a certain geographical area.

It's possible that fault occur which can compromise, in whole or in part, the operation of the tower, such as:

Lightning hitting the tower;
Performance degradation caused by the aging of components of the tower;
Malfunctioning caused by tampering.

In order to repair the tower it is need to send a team of technicians at the tower itself, who must analyze the failure, identify the component that has failed and fix it: this request a long time and therefore the costs for repair are also high.

It is further possible that one antenna does not work, but this is not detected because the failure is masked by other antennas positioned near the failed one: in this case, the television signal is not spread optimally.

BRIEF SUMMARY OF THE INVENTION

The present invention relates to a failure detection system of antennas transmitting television and I or radio signals as defined in the appended claim 1 and by its preferred embodiments described in the dependent claims 2 to 8.

The Applicant has perceived that the system for detecting failures in accordance with the present invention can reduce the time required to perform the repair, thus reducing the repair costs. It also has the advantage of allowing maintaining a good broadcast of the television signal.

The Applicant has also perceived that a monitoring system extended to other variables such as the temperature, the humidity, the electromagnetic field and the electrical phase of the signal at various points of a telecommunication tower allows an early and accurate diagnosis of the malfunctioning. Repair works may well be replaced by preventive maintenance, with an obvious positive effect on cost and reliability. The interventions may also be effected in safety conditions.

The object of the present invention includes also a television and/or radio broadcast tower as defined in the attached claim 9.

BRIEF DESCRIPTION OF THE DRAWINGS

Further characteristics and advantages of the invention will emerge from the description of a preferred embodiment and its variants provided by way of example with reference to the accompanying drawings, in which:

FIGS. 2A-2B schematically show a directional coupler used in the embodiment of the invention;

DETAILED DESCRIPTION OF THE INVENTION

Figure 1:
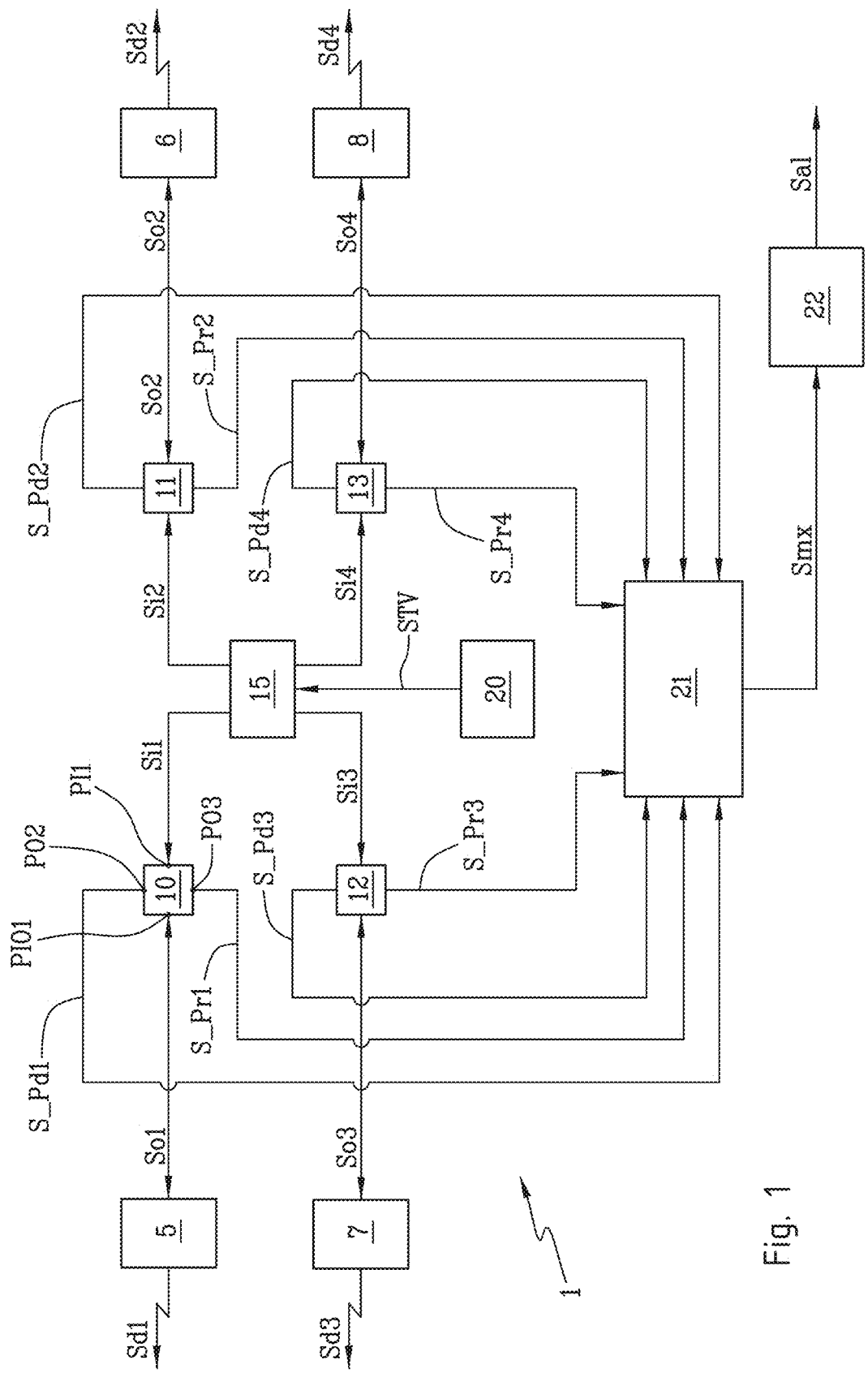
FIG. 1 shows schematically a failure detection system of antennas transmitting Television and/or radio signals according to one embodiment of the invention.

With reference to the FIG. 1, it is shown a failure detection system 1 of antennas that transmit television and/or radio signals according to one embodiment of the invention.

The detection system includes:
a source 20 of television and/or radio signal;
a power divider 15;
four directional couplers 10, 11, 12, 13;
four transmitting antennas 5, 6, 7, 8;
a concentrator signal 21;
a processing module 22.

The detection system 1 is positioned partly on a broadcast tower of television signal to an elevated height, for instance to at least 80 meters; the broadcast tower of television signal is opportunely positioned in select geographical sites (typically, on a mountain) so that to cover an wide geographical area as possible and therefore to serve the greatest number of users. Particularly, the processing module 22 and the source 20 are positioned in a closed structure positioned on the ground next to the broadcast tower of television signal, while the power divider 15, the directional couplers 10, 11, 12, 13, the transmitting antennas 5, 6, 7, 8 and the signal concentrator 21 are positioned on the broadcast tower of television signal, to a height at least equal to 80 meters.

The source 20 is such as to generate, a SW signal, television and/or radio-type. For example, the television signal is digital terrestrial-type and occupies the frequency bands VHF-type (170 Mhz and 250 Mhz) or UHF-type (between 250 Mhz and 900 Mhz), while the radio signal occupies the frequency band FM-type (ranging from 87.5 Mhz and 108 Mhz). For simplicity in the following we will refer only to the television signal, but similar consideration are applicable in the case of radio signal and in the case of television and radio signals.

The power divider 15 is a passive device that includes an input port and four output ports. The input port of the power divider 15 is connected with the signal source 20 and the four output ports are connected respectively with the four directional couplers 10, 11, 12, 13. In particular, the power divider is such to receive the STV broadcast signal and is such as to generate, in function of this, a first television input signal Si1, a second television input signal Si2, a third television input signal Si3, a quarter television input signal Si4. Each of the four television input signals Si1, Si2, Si3, Si4 is also a television-type signal that is equal to the STV television signal, but has a lower power level, in particular a fraction of the power of the STV television signal. The power levels of the four television input signals Si1, Si2, Si3, Si4 may be the same between them or different; for example, in the first case each of the television input signals Si1, Si2, Si3, Si4 has a power level that is a quarter of the power level of the STV television signal.

Each of the directional couplers 10, 11, 12, 13 has an input port connected with the power divider 15, an input port/output connected with a respective antenna 5, 6, 7, 8 and two output ports associated with the signal concentrator 21. Each of the directional couplers 10, 11, 12, 13 has the function to take a portion of the received power on the input port and a part of the power received on the input/output port: this allows to monitor the forward and reflected power present on the respective coaxial feed lines connected to the antennas 5, 6, 7, 8, in order to detect and identify a degradation or a failure of the antennas 5, 6, 7, 8, a failure of the connection cables between the antennas 5, 6, 7, 8 and the respective directional couplers 10, 11, 12, 13 or a failure of the power divider 15, as will be explained more in detail hereinafter. More particularly, each of the directional couplers 10, 11, 12, 13 is such as to couple the signal received on the input port with the signal transmitted on the input/output port and transmitted on the first output port; Furthermore, each of the directional couplers 10, 11, 12, 13 is such as to couple the received signal on the input/output port with the transmitted signal on the second output port.

With reference to the first directional coupler 10, it includes the input port PI1 to receive in input the first television input signal Si1 and includes an input/output port PIO1 to generate as output a first television output signal So1 equal to the first television input signal Si1, with a power level slightly lower due to a small attenuation that undergoes the television signal between the input port PI1 and the input port/output PIO1. Moreover, the input/output port PIO1 is such as to receive the reflected signal from the first antenna 5, as will be explained more in detail hereinafter. The first directional coupler 10 further includes a first power sensor 40 for measuring the first direct power Pd1 transmitted toward the antenna 5 and generate a first analog voltage signal $S_{Pd1}$ indicative of the value of the first direct power Pd1: in case the first power sensor 40 detects that the value of the first direct power Pd1 is lower than a first reference value, this means that a failure has occurred at a point precedent to the first power sensor 40, such as a failure of the divider power 15 or of the connection cable between the power divider 15 and the first directional coupler 10 or source 20 for example, in case of absence of failure the value of the first direct power Pd1 is equal to 3000 W.

The first directional coupler 10 further includes a second power sensor 41 to measure the first reflected power Pr1 which is reflected by the antenna 5 and generate a second analog voltage signal $S_{Pr1}$ indicative of the value of the first reflected power Pr1: in the case in which the second power sensor 41 detects that the value of the first reflected power Pr1 is greater than a second reference value, this means that a failure has occurred at a point next to the second power sensor 41, such as a failure of the antenna 5 or the connection cable between the first directional coupler 10 and the antenna 5. For example, in case of absence of failure the value of the first reflected power Pr1 is equal to 200 W. It is well known that a part of the power associated to the first television input signal Si1 is actually radiated by the antenna 5 as transmitted electromagnetic field carrying a first input television signal Sd1: the power associated with the first input television signal Si1 will be indicated later with "direct power Pd1. "A part (lower) of the power transmitted from the first input television signal Si1 is instead reflected back from the antenna due to the mismatch between the impedance of the supply line to the antenna 5 and the impedance of the antenna 5: this part will be shown later with "reflected power Pr1.

The above considerations relating to the first directional coupler 10 can be made in a similar way to the second directional coupler 11, the third directional coupler 12 and the fourth directional coupler 13. In particular, the second directional coupler 11 is such as to receive in input the second television signal input Si2 and is such as to generate as output a second output television signal So2 obtained from the second television input signal Si2; also the second directional coupler 11 includes a first power sensor for measuring the second direct power Pd2 transmitted towards the antenna 6 and includes a second power sensor for measuring the second reflected power Pr2 that is reflected from the antenna 6. The third directional coupler 12 is such as to receive in input the third input television signal Si3 and is such as to generate as output a third output television signal So3 obtained from the third input television signal Si3; also the third directional coupler 12 includes a first power sensor for measuring the third direct power Pd3 transmitted towards the antenna 7 and includes a second power sensor for measuring the third reflected power Pr3 that is reflected from the antenna 7. The fourth directional coupler 13 is such as to receive in input the fourth input television signal Si4 and is such as to generate as output a fourth output television signal So4 obtained from the fourth television input signal Si4; also the fourth directional coupler includes a first power sensor for measuring the direct fourth power Pd4 transmitted to the antenna 8 and includes a second power sensor for measuring the fourth reflected power Pr4 that is reflected from the antenna 8.

The first transmitting antenna 5 is connected with the first directional coupler 10, is such as to receive the first output television signal So1 and, in function of it, is such as to radiate an electromagnetic wave that carries a first broadcast television signal Sd1.

Similarly, the second transmitting antenna 6 is connected with the second directional coupler 11, is such as to receive the second output television signal So2 and, in function of it, is such as to radiate electromagnetic wave that carries a second broadcast television signal Sd2. The third transmitting antenna 7 is connected with the third directional coupler 12, is such as to receive the third television output signal So3 and, in function of it, is such as to radiate an electromagnetic wave carrying a third broadcast television signal Sd3. The fourth transmitting antenna 8 is connected with the fourth directional coupler 13, is such as to receive the fourth output television signal So4 and, in function of it, is such as to radiate electromagnetic wave that carries a fourth broadcast television signal Sd4. The signal concentrator 21 is connected with the four directional couplers 10, 11, 12, 13 and has the function of collecting the analog voltage signals generated by the power sensors placed inside of the four directional couplers 10, 11, 12, 13. Signal concentrator 21 has also the function to perform a conversion of the analog voltage signals from analog to digital. In particular, the concentrator signal 21 is such as to receive the analog voltage signals indicative of the values of the direct powers Pd1, Pd2, Pd3, PD4 and reflected powers Pr1, Pr2, Pr3, Pr4 and, in function of them, is arranged to generate a multiplexed digital signal Smx that carries digital values indicative of the direct power Pd1, Pd2, Pd3, Pd4 and reflected powers Pr1, Pr2, Pr3, Pr4.

The processing module 22 is such as to receive the digital signal multiplexed Smx that carries the digital values indicative of the direct powers Pd1, Pd2, Pd3, Pd4 and reflected powers Pr1, Pr2, Pr3, Pr4, is arranged to compare the digital values indicative of the direct powers Pd1, Pd2, Pd3, Pd4 and reflected powers Pr1, Pr2, Pr3, Pr4 with respective reference values. Where one or more digital indicative values of the direct powers Pd1, Pd2, Pd3, PD4 are lower than the respective reference values or in the case that one or more digital indicative values of the reflected powers Pr1, Pr2, Pr3, Pr4 are greater than their respective reference values, the processing module 22 is arranged to generate an alarm signal Ps indicative of a failure of one or more between the antennas 5, 6, 7, 8 or a failure of one or more connection cables between the antennas 5, 6, 7, 8 and the respective sensors 5, 6, 8, or failure of the source 20 or a failure of the power divider 15. The processing module 22 includes a memory for storing the reference values of the direct powers Pd1, Pd2, Pd3, Pd4 and reflected powers Pr1, Pr2, Pr3, Pr4.

Preferably, the processing module is connected with a local screen that represents the antennas 5, 6, 7, 8 and the values measured by the sensors in the directional couplers 10, 11, 12, 13.

Figure 2B:
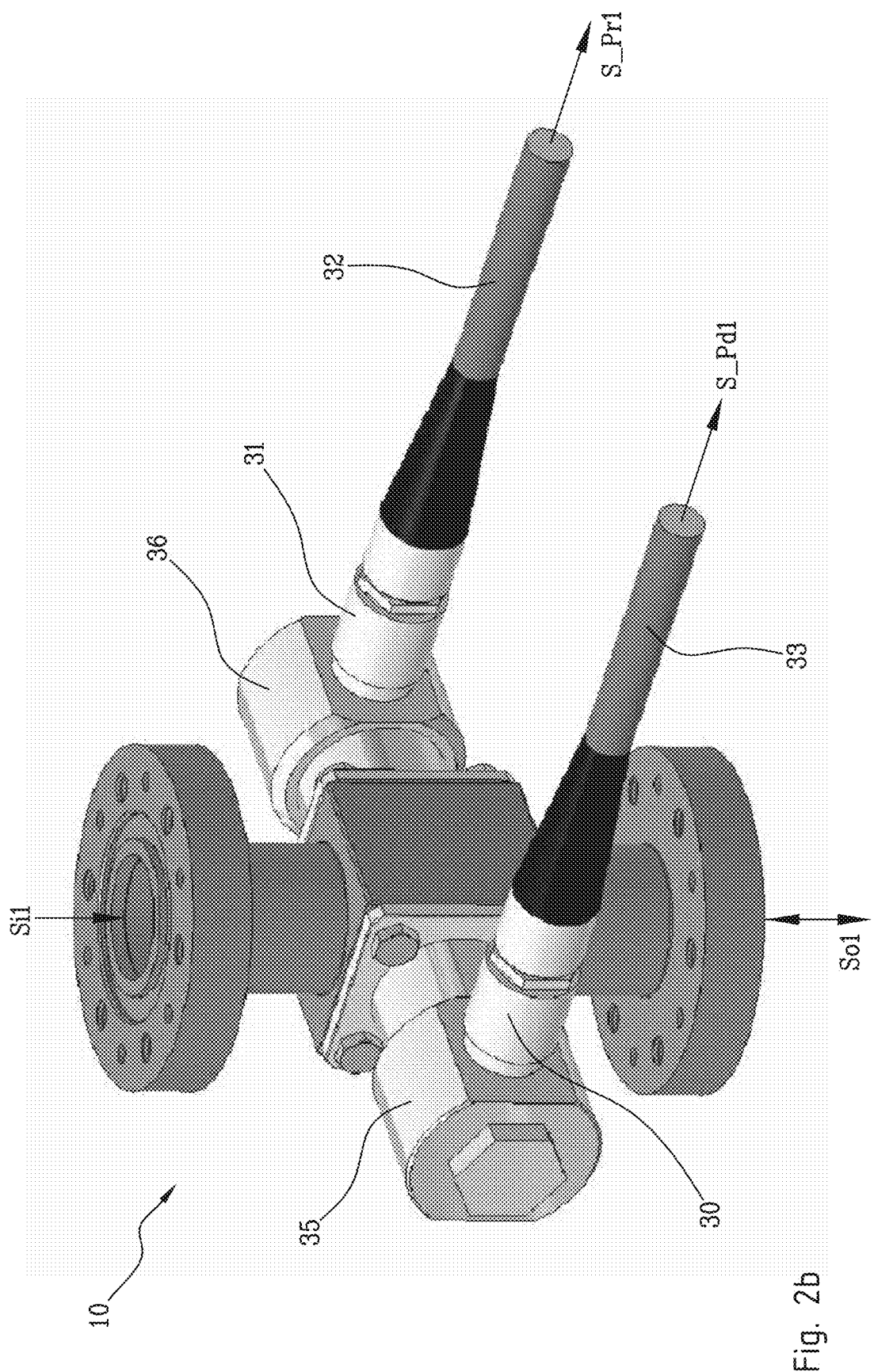

With reference to FIGS. 2A-2B, is shown in more detail the directional coupler 10 used in the detection system 1. The body of the directional coupler 10 is made of metallic material: this allows to obtain a shielding against interference of electromagnetic waves, that may worsen the measurement of the first direct power Pd1 performed by the power sensor 40 and the measurement of the reflected power Pr1 first performed by the power sensor 41. The directional coupler 10 includes an outer conductor 31 of essentially cylindrical shape and an inner conductor 32 of essentially cylindrical shape (not shown in FIGS. 2A-2B and shown schematically in FIG. 3), in which the inner conductor 32 is coaxial to the outer conductor 31. The directional coupler 10 includes the input port PI1 which is realized with an opening of essentially circular shape to which is connected the connector of a coaxial cable that carries the first input television signal Si1 and includes the entrance/exit PIO1 that is made with an opening of essentially circular shape to which is connected the connector of a coaxial cable that carries the first output television signal So1.

The directional coupler 10 further includes a first essentially cylindrical element 35 having an opening of essentially circular shape, which performs a first output port PO2, which is mechanically connected to the connector 30 of a shielded cable 33 which carries the first analog voltage signal $S_{Pd1}$ indicative of the value of the first direct power Pd1 measured from the first power sensor 40; Furthermore the directional coupler 10 includes a second essentially cylindrical element 36 having an opening of essentially circular shape, which performs a second output port PO3, which is mechanically connected to the connector 31 of a shielded cable 32 which carries the second analog voltage signal $S_{Pr1}$ indicative of the value of the first reflected power Pr1 measured from the second power sensor 41. The shielded cable that carries the first analog voltage signal $S_{Pd1}$ and the second analog voltage signal $S_{Pr1}$ for instance the cable Belden 9844, which includes four metallic copper conductors twisted in pairs, which are wrapped by a sheet of conductive material that has the function of screen against electromagnetic waves.

It can also be noted that the first essentially cylindrical element 35 includes the first power sensor 40 which detects the first direct power Pd1 and the second essentially cylindrical element 36 includes the second power sensor 41 which detects the first reflected power Pr1.

Figure 3:
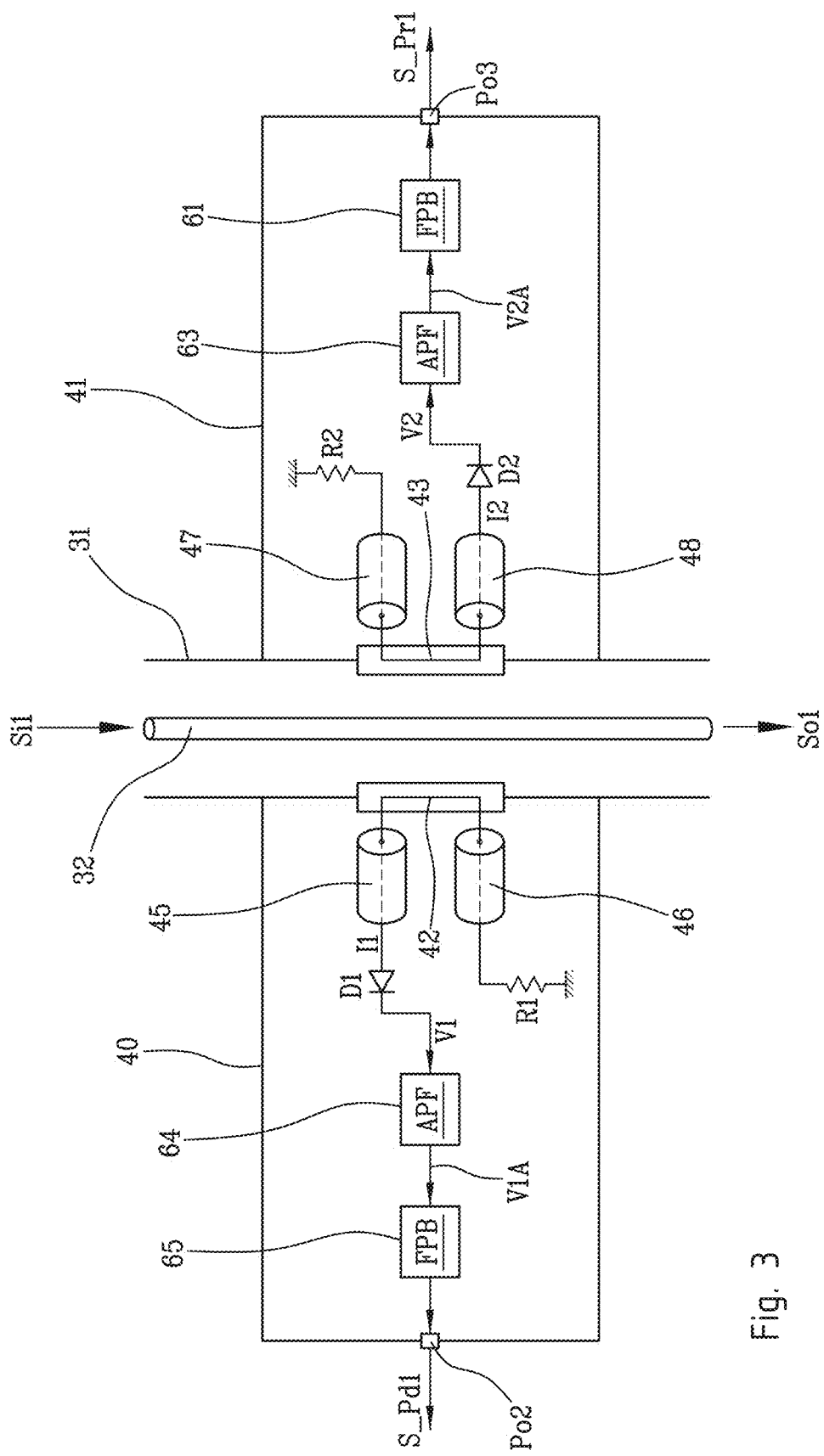
FIG. 3 shows in more detail two power sensors positioned in the directional coupler of FIGS. 2A-2B.

Advantageously, with reference to FIG. 3, the first power sensor 40 includes:

A conductive wire 42;

Two coaxial cables 45, 46, in which a first end of the coaxial cable 45 is connected at a first end of the conductive wire 42 and a first end of the coaxial cable 46 is connected to a second end of the conductive wire 42;

A first diode d1 having the anode terminal connected to a second end of the coaxial cable 45;

A first resistor R1 having a first terminal connected to a second end of the coaxial cable 46 and having a second terminal connected to the ground;

An amplifier 64 having an input terminal connected to the cathode terminal of the first diode D1 and having an output terminal;

A low-pass filter 65 having an input terminal connected to the output terminal of the amplifier 64 and having an output terminal connected to the first output port Po2.

The conductive wire 42 is such as to capture a part of the first direct power Pd1 transmitted to the antenna 5 and is such as to generate, in function of it, a first current signal I1 proportional to the value of the first direct power Pd1. The coaxial cable 45 is such as to carry the first current signal I1; in this case, the first diode D1 is such as to enter into conduction, generating on a cathode terminal a first voltage signal V1. For example, the first voltage signal V1 has values between 0 and 2 V. The amplifier 64 is such as to receive the first voltage signal V1 and is such as to generate, in function of it, a first voltage signal amplified V1A. The low-pass filter 65 is such as to receive the first voltage signal amplified V1A, is such as to perform a low-pass filtering and is such as to generate the first analog voltage signal $S_{Pd1}$ indicative of the value of the first direct power Pd1. For example, the first analog voltage signal $S_{\_Pd1}$ has values between 0 and 10 V.

Similarly, with reference to FIG. 3, the second power sensor 41 includes:

a conductive wire 43;

two coaxial cables 47, 48, in which a first end of the coaxial cable 47 is connected at a first end of the conductive wire 43 and a first end of the coaxial cable 48 is connected to a second end of the conductive wire 43;

a second resistor R2 having a first terminal connected to a second end of the coaxial cable 47 and having a second terminal grounded connected;

a second diode D2 having the anode terminal connected to a second end of the coaxial cable 48;

an amplifier 63 having an input terminal connected to the cathode terminal of the second diode D2 and having an output terminal;

a low-pass filter 63 having an input terminal connected to the output terminal of the amplifier 63 and having an output terminal connected to the second output port PO3.

The conductive wire 43 is such as to capture a part of the first reflected power Pr1 reflected by the antenna 5 and is such as to generate, in function of it, a second current signal I2 proportional to the value of the first reflected power Pr1. The coaxial cable 48 is such as to transport the second current signal I2; in this case the second diode D2 is such as to enter into conduction, generating on a cathode terminal of the second voltage signal V2. For example, the second voltage signal V2 has values between 0 and 2 V. The amplifier 63 is such as to receive the second voltage signal V2 and is such as to generate, in function of it, a second amplified voltage signal V2A. The low-pass filter is such as to receive the amplified second voltage signal V2A, is such as to perform a low-pass filtering and is such as to generate the second analog voltage signal $S_{Pr1}$ indicative of the value of the first reflected power Pr1. For example, the second analog voltage signal $S_{Pr1}$ has values between 0 and 10 V.

Note that the first diode D1 is connected with the coaxial cable 45 positioned at the top, while the second diode D2 is connected with the coaxial cable 48 positioned down, or the first diode D1 is connected in an asymmetrical way with respect to the second diode D2: this allows to generate the first current signal I1 proportional only to the value of the first direct power Pd1 (meaning that I1 does not depend on the value of the first reflected power Pr1) and allows to generate the second current signal I2 proportional only to the value of the first reflected power Pr1 (meaning that I2 does not depend on the value of the first power direct Pd1). Consequently, the first analog voltage signal $S_{Pd1}$ is proportional only to the value of the first power direct Pd1, while the second analog voltage signal $S_{Pr1}$ is proportional only to the value of the first reflected power Pr1.

Note that FIGS. 1, 2A, 2B show that the directional couplers 10, 11, 12, 13 are separated from the antennas 5, 6, 7, 8 and by the power divider 15, but other variations are possible.

According to a first variant, the directional couplers 10, 11, 12, are, respectively integrated in the antennas 5, 6, 7, 8. In this case, with reference for example to the antenna 5, it includes an input port to receive the first input television signal Si1, includes a first output port (similar to port PO2) to provide the first analog voltage signal $S_{Pd1}$ indicative of the value of the first power direct Pd1 and includes a second output port (similar to port PO3) to provide the second analog voltage signal $S_{Pr1}$ indicative of the value of the first reflected power Pr1. Similar considerations can be made for the antennas 6, 7, 8, each including an input port for receiving an input television signal and two output ports to provide the analog voltage signals indicative of the power of the direct and reflected power. According to a second variant, the directional couplers 10, 11, 12, 13 are integrated in the power divider 15. In this case, the power divider 15 further includes four output ports to provide the analog voltage signals indicative of the power direct Pd1, Pd2, Pd3, Pd4 and further includes four output ports to provide the analog voltage signals indicative of the reflected power Pr1, Pr2, Pr3, Pr4.

It will be now described a first operation of the failure detection system 1, with reference also to FIG. 1.

At the initial time $t_0$ there are no failure in the broadcast tower of television signal on which it is installed the detection system 1.

At the time $t_1$ (following $t_0$) a check of a failure in the antenna 5 is done: this causes a considerable increment of the value of the first reflected power Pr1 detected by the second power sensor 41 positioned in the first directional coupler 10. In particular, the second power sensor 41 generates the second analog voltage signal $S_{Pr1}$ indicative of the first reflected power Pr1 related to the first antenna 5. The concentrator 21 receives the value VAr1 indicative of the first reflected power Pr1 related to the first antenna 5, receives the analog voltage values indicative of the reflected powers Pr2, Pr3, Pr4 related to the antennas 6, 7, 8 and of the direct powers Pd1, Pd2, Pd3, Pd4 related to the antennas 5, 6, 7, 8 and generates the Smx digital multiplexed signal carrying a digital value $VD_{r1}$ indicative of the first reflected power Pr1 and digital values indicative of the reflected power Pr2, Pr3, Pr4 and of the direct powers Pd1, Pd2, Pd3, Pd4.

The processing module 22 receives the Smx digital multiplexed signal and extracts from that the digital value $VD_{r1}$ indicative of the first reflected power Pr1, the digital values indicative of the reflected powers Pr2, Pr3, Pr4 and of the direct powers Pd1, Pd2, Pd3, Pd4. Subsequently, the processing module 22 performs the comparison of the digital value of the first $VD_{r1}$ indicative of the first reflected power pr1 with a first reference value $V_{r1}$ and detects that the digital value $VD_{r1}$ is greater than the first reference value $V_{r1}$; furthermore the processing module 22 performs the comparison of the digital values indicative of the reflected powers Pr2, Pr3, Pr4 and of the direct powers Pd1, Pd2, Pd3, Pd4 with respective reference values and detects that the digital values indicative of the reflected powers Pr2, Pr3, Pr4 are less than respective reference values and the digital values of the direct powers pd1, pd2, pd3, pd4 are greater than respective reference values: this indicates that there was only one failure, and that this failure is positioned at a point subsequent to the first directional coupler 10, or rather in the cable that connects the first directional coupler 10 with the antenna 5 or in the same antenna 5. The processing module 22 then generates the alarm signal $s_{a1}$ indicative of a failure of the antenna with the antenna 5. In this way it is possible to quickly detect the presence of the failure, and also it is possible to detect the type of failure, thereby facilitating the work repair by technicians.

Now follows a description of a second operation of the detection failure system 1, in reference to the FIG. 1.

At the initial time $t_0'$ there are no failure in the broadcast tower of the television signal on which is installed the detection system 1.

At the time t1 '(following $t_0'$) there is a partial failure of the power divider 15 that could affect the first television input signal si1: this causes a significant decrease in the value of the first direct power pd1 detected by the first sensor power 40 positioned in the first directional coupler 10 and also causes a considerable decrease of the value of the first reflected power pr1 detected by the second power sensor 41 positioned in the first directional coupler 10. In particular, the first power sensor 40 generates the first analog voltage signal $s_{Pd}$, having a value indicative of the first direct power Pd1 associated with the first antenna 5. The signal concentrator 21 receives the value vad1 indicative of the first direct power vad1 linked to the first antenna 5, receives the analog values of voltage indicative of the power of direct Pd2, Pd3, Pd4 linked to the antennas 6, 7, 8 and of the reflected power Pr1, Pr2, Pr3, Pr4 linked to the antennas 5, 6, 7, 8, and generates the digital signal multiplexed Smx that carries a digital value $VD_{d1}$ indicative of the first direct power pd1 and digital values indicative of the direct powers Pd2, Pd3, Pd4 and reflected powers Pr1, Pr2, Pr3, Pr4.

The processing module 22 receives the digital multiplexed signal smx and extracts from this the digital value vdd1 indicative of the first direct power Pd1, the digital values indicative of the direct powers Pd2, Pd3, Pd4 and reflected powers Pr1, Pr2, Pr3, Pr4. Subsequently, the processing module 22 performs the comparison of the digital value $VD_{d1}$ indicative of the first direct power Pd1 with a second reference value Vr2 and detects that the digital value $VD_{d1}$ is less than the second reference value Vr2; in addition the processing module 22 performs the comparison of the digital values indicative of the direct powers Pd2, Pd3, Pd4 and reflected powers Pr1, Pr2, Pr3, Pr4 with respective reference values and detects that the digital values indicative of the direct powers Pd2, Pd3, Pd4 are greater than the reference values and the digital values of the reflected powers Pr1, Pr2, Pr3, Pr4 are lower than the respective reference values: indicating that there was only one failure and that failure is positioned at a point prior to the first directional coupler 10, or rather in the power divider 15 or in the connection line between the power divider 15 and the first directional coupler 10 or in the source 20. The processing module 22 then generates the alarm signal $s_{at}$ indicative of a failure of the power divider 15 or of the connection cable between the power divider 15 and the first directional coupler 10 or the source 20. In this manner, it is possible to quickly detect the presence of the failure, and also it is possible to detect the type of failure, facilitating repair work by technicians.

Preferably, the processing module 22 is such as to generate the alarm signal $s_{al}$ having a high logical value to indicate that a fault has occurred when this persists for a given time interval (eg, five minutes).

Figure 4:
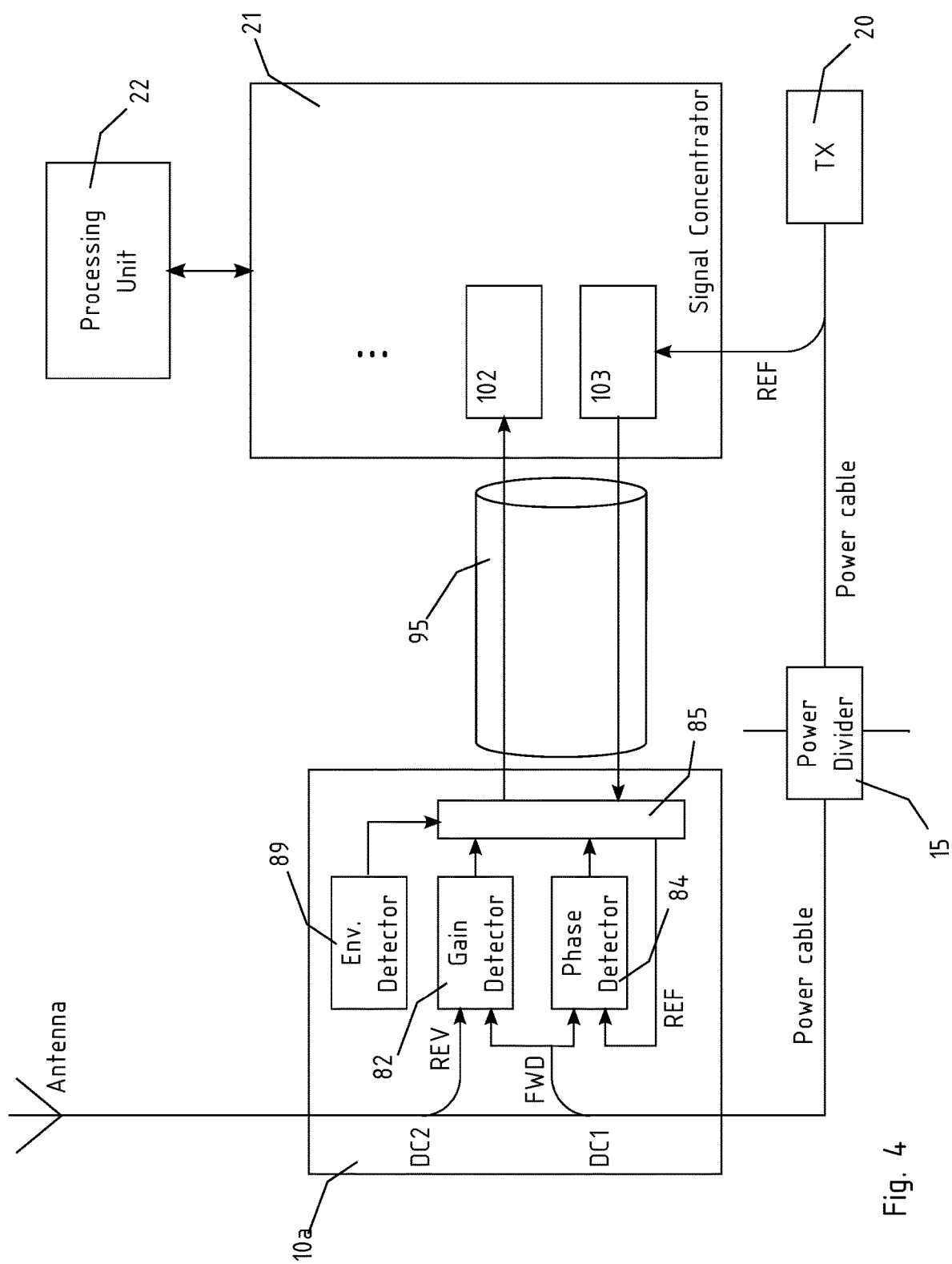
FIG. 4 is a conceptual scheme of a variant of the present invention that includes the ability to measure the electrical phase of the signal as well as of the environmental parameters.

FIG. 4 Illustrates schematically a variant of the present invention, which includes the technical means for measuring other environmental variables in addition to the measurement of ROS, such as temperature, humidity and electromagnetic field. This variant is also able to measure the electrical phase of the UHF or VHF signal present to various antenna and/or power dividers of a telecommunication tower.

Although if the local and continuous measurement of ROS, as illustrated just now, allows a precise and reliable control, the quality demands increasingly thrusts of reliability and safety required by the operators justify, in many cases, the more complete measures.

FIG. 4 Illustrates, to simplify the drawing, only one measurement point 10. The invention is of course not limited to this example, and in an embodiment may include a plurality of measuring points as described, positioned in various strategically chosen points of a measurement tower, for instance to the antennas, and the power dividers. That means the unit signals concentrator 21 will be equipped of a plurality of receiving units 102 and transmission units 103, so that to serve all the measuring points. The reference numbers already used in the previous figures indicate identical elements or functionally equivalent to what is described above.

The measuring device 10*a*, functionally equivalent to the couplers 1 shown on FIG. 1, is equipped, as will be described in more detail below, to measure the standing wave ratio (VSWR) at the installation point. For this purpose, it includes two directional couplers DC1 and DC2 to capture the direct signal traveling from the transmitter 20 to the antenna (FWD), and the one reflected by the latter (REV).

The directional couplers DC1 and DC2 can be made with the conductor elements accommodated in the space of propagation, as represented in FIG. 3, or by any other known device.

Preferably, the dispositive 10*a* is able to directly process the direct and reflected signals and obtaining the standing wave ratio by means of a measuring gain circuit 82, namely a circuit capable of generating an output signal equal to the ratio between the two input signals. This result may be obtained for example trough the monolithic circuit AD8302 manufactured by the Analog Devices firm, or other functionally equivalent means.

The value of the ROS at the output of the circuit 82 is then processed by an interface 85 and transmitted to the concentrator signal 21 by a link 95. The connection 95 can be realized with any appropriate technique, analog or digital, on or shielded coaxial cable, optical fiber, or any other transmission medium capable of ensuring immunity request to the electromagnetic interferences. The coaxial cables and optical fibers offer in this sense good characteristics.

The measuring device 10*a* further preferably includes one or more sensors environmental-type 89 which detect quantities of diagnostic interest, not necessarily directly related to the transmission line. Such sensors may include temperature sensors, humidity sensors, or electromagnetic field sensors. The data on temperature and humidity may be used for the control of plant enticing, where present, and to identify the infiltration of rain or moisture. The data of the electromagnetic field, are also used to organize actions in compliance with the safety standards.

The environmental sensors 89 may also include mechanical load sensors, for example load cells or "strain gauges", to measure the static and dynamic stresses imposed on the structure of the tower or of the antennas. The values of the environmental sensors are processed by the interface circuit 85 and transmitted to the concentrator 21 through the connection 95.

The measurement of the electrical phase is another parameter of great importance for the purpose of diagnostics. In the illustrated example it is performed by means of a phase detector 84 which compares the phase of the direct signal with a reference phase signal REF. The reference phase signal is transmitted to the device 10*a* by means of a link independent of the transmission line, and whose electrical length is sufficiently stable. In the illustrated example the signal reference phase is taken from the transmission line and sent to the unit signal 10*a* from the concentrator 21 through the connection 95 which is, for example an optical fiber able of supporting bidirectional transmission of digital data. There are, however, other possible solutions.

Several solutions are possible for the realization of the phase detector circuit 84. The AD8302 already mentioned also includes an analog phase detector usable for this purpose.

According to another variant, not shown in the figures, the detection of the electrical phase is not performed in the unit 10*a*, but rather in the concentrator of signals 21. For this purpose, the unit 1*a* transmits to the latter a signal that contains information of a phase through the connection 95. As in the previous case, the correlation between the phase signal and the reference phase gives information on the electrical phase exists at the point of insertion of the unit 10*a*, insofar as the transmission delay along the link 95 is known, or at least stable.

Optionally, the unit 10*a* and/or the concentrator 21 are equipped of a measurement system of the transmission delay along the link 95. The knowledge of such parameter allows an absolute measurement of the electrical phase and the offsetting of its possible variations. The measurement of the transmission delay can be realized with any suitable technique, for example along the link 95 by sending a signal and measuring the time needed to the reception of a response from the device at the other end.

It is noted that for the purposes of explanation of the invention in FIG. 1 four antennas 5, 6, 7, 8 and four directional couplers 10, 11, 12, 13 have been shown, but the invention is applicable to a number of antennas greater than or equal to two and a corresponding number of directional couplers greater than or equal to two.

The invention claimed is:

1. A failure detection system of a plurality of transmitting antennas of television and/or radio signals connected to a transmitting station by means of transmission lines and power dividers, the system including a plurality of measuring devices coupled to the transmission lines in correspondence of the antennas and/or the power dividers, able to measure a standing wave ratio, said measuring devices being connected by means of links to a signal concentrator unit, wherein the antennas, the measuring devices and the concentrator unit are positioned on a broadcast tower, and the concentrator unit generates a multiplexed signal.

2. The failure detection system of claim 1, including:
- a power divider configured to receive a television and/or radio signal and from this generates a first plurality of television and/or radio signals;
- a plurality of directional couplers configured to receive the first plurality of television and/or radio signals and from these generate a corresponding second plurality of television and/or radio signals, the plurality of directional couplers including:
  - respective first power sensors configured to generate a third plurality of signals indicative of the direct power transmitted to the plurality of antennas;
  - respective second power sensors configured to generate a fourth plurality of signals indicative of the reflected power from the plurality of antennas;
- a signal concentrator configured to receive the third plurality of signals indicative of the direct power and the fourth plurality of signals indicative of the reflected power and generate a multiplexed signal carrying the third and fourth plurality of signals;
- a processing module configured to:
  - receive the multiplexed signal;
  - compare the values of the third plurality of signals indicative of the direct power and of the fourth plurality of signals indicative of the reflected power with respective reference values;
  - generate a signal indicative of a failure of at least one of the plurality of antennas in the case in which at least one of the values of the fourth plurality of signals indicative of the reflected power is greater than the respective reference value;
  - generate the signal indicative of a failure of the power divider in the case in which at least one of the values of the third plurality of signals indicative of the direct power is less than the respective reference value.

3. The failure detection system according to claim 1, wherein the first sensor of a first directional coupler selected from the plurality of directional couplers includes:
- a first conductor wire to capture a part of the first direct power transmitted towards a first antenna selected from the plurality of antennas and generate a first signal current proportional to the first direct power;
- a first coaxial cable having a first end connected with a first end of the first conductor wire, the coaxial cable being configured to deliver the first current signal;
- a second coaxial cable having a first end connected with a second end of the first conductive wire;
- a first diode having its anode terminal connected with a second end of the first coaxial cable;
- a first resistor connected between a second end of the second coaxial cable and a ground;
- a first amplifier having an input terminal connected with the cathode terminal of the first diode and having an output terminal;
- a first low-pass filter having an input terminal connected with the output terminal of the first amplifier and having an output terminal for providing a first analog voltage signal indicative of the value of the first direct power.

4. The failure detection system according to claim 2, wherein the second sensor of the first directional coupler includes:
- a second conductor wire to capture a part of the first reflected power from the first antenna and generate a second current signal proportional to the first reflected power;
- a third coaxial cable having a first end connected with a first end of the second wire conductor;
- a quarter coaxial cable having a first end connected with a second end of the second conductor wire, the fourth coaxial cable being configured to deliver the second current signal;
- a second resistor connected between a second end of the third coaxial cable and the ground;
- a second diode having the anode terminal connected with a second end of the fourth coaxial cable;
- a second amplifier having an input terminal connected with the terminal cathode of the second diode and having an output terminal;
- a second low-pass filter having an input terminal connected with the output terminal of the second amplifier and having an output terminal for providing a second analog voltage signal indicative of the value of the first reflected power; wherein the first diode is connected in an asymmetrical way with respect to the second diode.

5. The failure detection system according to claim 2, the first directional coupler being made of metallic material and having:
- an outer conductor and an inner conductor coaxial to the outer conductor;
- an input port for receiving a signal of the first plurality of television and/or radio signals, said input port being positioned at a first end of the outer conductor and being formed with an opening of essentially circular shape;
- an input/output port for generating a signal of the second plurality of television and/or radio signals, said input/output port being positioned at a second end of the outer conductor and being formed with an opening having a shape essentially circular;
- a first essentially cylindrical element having a first output port for generating a signal of the third plurality of signals, said first output port being formed with an opening of essentially circular shape;
- a second essentially cylindrical element having a second output port for generating a signal of the fourth plurality of signals, said second output port being formed with an opening of essentially circular shape.

6. The failure detection system according to claim 4, further including:
- a first shielded cable mechanically connected to the first output port to deliver the first analog voltage signal indicative of the value of the first direct power;
- a second shielded cable mechanically connected to the second output port to carry the second analog voltage signal indicative of the value of the first reflected power.

7. The failure detection system according to claim 1, wherein the signal concentrator is adapted to generate a digital multiplexed signal.

8. The failure detection system according to claim 1, further including the plurality transmitting antennas of television and/or radio signals, wherein the plurality of directional couplers is integrated respectively in the plurality of transmitting antennas.

9. The failure detection system according to claim 1, wherein the plurality of directional couplers is integrated in the power divider.

10. The failure detection system according to claim 1, wherein said connection is bidirectional.

11. The failure detection system according to claim 1, wherein said connection comprises the transmission of digital data over optical fiber.

12. The failure detection system according to claim 1, wherein at least one of said devices generates a signal representative of the electrical phase to the respective point of coupling with the transmission line.

13. The failure detection system according to claim 1, wherein at least one of said measuring devices generates one or more signals representative of environmental parameters.

14. Tower for broadcasting of television and/or radio signal including:
   a plurality of antennas transmitting television and/or radio signals configured to receive the second plurality of television and/or radio signals and transmit a corresponding plurality of television and/or radio signals;
   the power divider, the plurality of directional couplers and the concentrator signal of the failure detection system according to claim 1.

15. A failure detection system of a plurality of transmitting antennas of television and/or radio signals connected to a transmitting station by means of transmission lines and power dividers, the system including a plurality of measuring devices coupled to the transmission lines in correspondence of the antennas and/or the power dividers, able to measure a standing wave ratio, said measuring devices being connected by means of links to a signal concentrator unit, including:
   a power divider configured to receive a television and/or radio signal and from this generates a first plurality of television and/or radio signals;
   a plurality of directional couplers configured to receive the first plurality of television and/or radio signals and from these generate a corresponding second plurality of television and/or radio signals, the plurality of directional couplers including:
      respective first power sensors configured to generate a third plurality of signals indicative of the direct power transmitted to the plurality of antennas;
      respective second power sensors configured to generate a fourth plurality of signals indicative of the reflected power from the plurality of antennas;
   a signal concentrator configured to receive the third plurality of signals indicative of the direct power and the fourth plurality of signals indicative of the reflected power and generate a multiplexed signal carrying the third and fourth plurality of signals;
   a processing module configured to:
      receive the multiplexed signal;
      compare the values of the third plurality of signals indicative of the direct power and of the fourth plurality of signals indicative of the reflected power with respective reference values;
      generate a signal indicative of a failure of at least one of the plurality of antennas in the case in which at least one of the values of the fourth plurality of signals indicative of the reflected power is greater than the respective reference value;
      generate the signal indicative of a failure of the power divider in the case in which at least one of the values of the third plurality of signals indicative of the direct power is less than the respective reference value.

16. The failure detection system of claim 15, wherein the first sensor of a first directional coupler selected from the plurality of directional couplers includes:
   a second conductor wire to capture a part of the first reflected power from the first antenna and generate a second current signal proportional to the first reflected power;
   a third coaxial cable having a first end connected with a first end of the second wire conductor;
   a quarter coaxial cable having a first end connected with a second end of the second conductor wire, the fourth coaxial cable being configured to deliver the second current signal;
   a second resistor connected between a second end of the third coaxial cable and the ground;
   a second diode having the anode terminal connected with a second end of the fourth coaxial cable;
   a second amplifier having an input terminal connected with the terminal cathode of the second diode and having an output terminal;
   a second low-pass filter having an input terminal connected with the output terminal of the second amplifier and having an output terminal for providing a second analog voltage signal indicative of the value of the first reflected power; wherein the first diode is connected in an asymmetrical way with respect to the second diode.

17. The failure detection system of claim 16, further including:
   a first shielded cable mechanically connected to the first output port to deliver the first analog voltage signal indicative of the value of the first direct power;
   a second shielded cable mechanically connected to the second output port to carry the second analog voltage signal indicative of the value of the first reflected power.

18. The failure detection system of claim 15, the first directional coupler being made of metallic material and having:
   an outer conductor and an inner conductor coaxial to the outer conductor;
   an input port for receiving a signal of the first plurality of television and/or radio signals, said input port being positioned at a first end of the outer conductor and being formed with an opening of essentially circular shape;
   an input/output port for generating a signal of the second plurality of television and/or radio signals, said input/output port being positioned at a second end of the outer conductor and being formed with an opening having a shape essentially circular;
   a first essentially cylindrical element having a first output port for generating a signal of the third plurality of signals, said first output port being formed with an opening of essentially circular shape;
   a second essentially cylindrical element having a second output port for generating a signal of the fourth plurality of signals, said second output port being formed with an opening of essentially circular shape.

19. A failure detection system of a plurality of transmitting antennas of television and/or radio signals connected to a transmitting station by means of transmission lines and power dividers, the system including a plurality of measuring devices coupled to the transmission lines in correspondence of the antennas and/or the power dividers, able to measure a standing wave ratio, said measuring devices being connected by means of links to a signal concentrator unit, wherein the first sensor of a first directional coupler selected from the plurality of directional couplers includes:
- a first conductor wire to capture a part of the first direct power transmitted towards a first antenna selected from the plurality of antennas and generate a first signal current proportional to the first direct power;
- a first coaxial cable having a first end connected with a first end of the first conductor wire, the coaxial cable being configured to deliver the first current signal;
- a second coaxial cable having a first end connected with a second end of the first conductive wire;
- a first diode having its anode terminal connected with a second end of the first coaxial cable;
- a first resistor connected between a second end of the second coaxial cable and a ground;
- a first amplifier having an input terminal connected with the cathode terminal of the first diode and having an output terminal;
- a first low-pass filter having an input terminal connected with the output terminal of the first amplifier and having an output terminal for providing a first analog voltage signal indicative of the value of the first direct power.

* * * * *